Patented Oct. 31, 1950

2,527,591

UNITED STATES PATENT OFFICE 2,527,591

HYDROXYMETHYL SILOXANES

John Leopold Speier, Jr., Pittsburgh, Pa., assignor to Dow Corning Corporation, Midland, Mich., a corporation of Michigan No Drawing. Application July 2, 1948, Serial No. 36,815. In Great Britain August 26, 1947

5 Claims. (Cl. 260—448.2)

The present invention relates to the production of primary alcohols which are substituted with an organosilicon radical in the alpha position.

The chemistry of the organosilicon compounds has to a large extent for many years past been a thing apart from organic chemistry. In the previous work on the organosilicon compounds the major development has been in silanes and siloxanes substituted with hydrocarbon radicals on the silicon and in which the functional bonds were between the silicon and atoms linked directly thereto. The fact that the primary functionality of these materials was directly associated with the silicon, resulted in the major development work centering around hydrolyzable silanes and around variations in the geometry of the skeleton of the siloxane molecules derived by hydrolysis thereof. These materials were free of functionality other than that inherent in siloxane bonds.

Objects of the present invention are to provide methods for the production of primary organic alcohols of organosilicon materials.

In accordance with the present invention an organic ester which is substituted with an organosiloxane radical in the alpha position of a primary alcohol is subjected to alcoholysis. By this means the group linked to the silicon atom which contains an ester linkage in the group is converted to a hydroxymethyl group on the silicon atom.

The esters employed herein may be prepared from chloromethyl substituted silicon compounds. These chloromethyl compounds may be produced by any suitable or appropriate means. Thus, they may be produced by the chlorination of trimethyl silicon chloride to produce chloromethyl dimethyl silicon chloride. This may be hydrolyzed and condensed to yield symmetrical bis-chloromethyl tetramethyl disiloxane. It may likewise be co-hydrolyzed and co-condensed with dimethyl silicon dichloride to produce linear dimethyl siloxanes end-blocked with chloromethyl dimethyl silyl groups. The chloromethyl dimethyl silicon chloride may likewise be co-hydrolyzed and co-condensed with chloromethyl methyl silicon dichloride, produced by direct chlorination of dimethyl silicon dichloride. Upon co-condensation, linear chloromethyl methyl siloxanes are obtained which are end-blocked with chloromethyl dimethyl silyl groups. The chloromethyl dimethyl silicon chloride may be co-hydrolyzed and co-condensed with trimethyl silicon chloride. When these two materials are in equivalent amounts there is obtained a 50 mol per cent yield of chloromethyl pentamethyl disiloxane and a 25 mol per cent yield of symmetrical bis-chloromethyl tetramethyl disiloxane.

In the direct chlorination processes above described, good yields of products containing chloromethyl radicals are obtained. If other than methyl radicals are contained in the silanes chlorinated, the separation of relatively pure materials from the chlorination products is somewhat complicated due to the chlorination of other than methyl radicals. Accordingly, when it is desired to produce siloxanes which contain other than methyl radicals linked to the same silicon as the chloromethyl radicals, it is desirable to effect the chlorination of a methyl silicon chloride free of other organic radicals. The product of this chlorination may then be subjected to reaction with a Grignard reagent whereby to introduce into the silane any desired organic radicals. Thus, the remaining radicals in the siloxane may be alkyl radicals, either lower alkyl, such as methyl, ethyl or higher alkyls such as octadecyl, or they may be aryl radicals, such as phenyl.

Chloromethyl methyl silicon dichloride produced as above indicated, may be co-hydrolyzed and co-condensed with trimethyl silicon chloride to produce linear chloromethyl methyl siloxanes end-blocked with trimethyl silyl groups.

Cyclic siloxanes may also be employed in the process of the present invention. These cyclic siloxanes contain one or more chloromethyl radicals with the remainder being hydrocarbonyl radicals. In these compounds the total number of radicals is equal to twice the number of silicon atoms. Compounds of this type may be produced by direct chlorination of cyclic dimethyl siloxanes. In the production of these materials by direct chlorination it is desirable to chlorinate only very mildly so as to introduce but one chlorine per cycle. By this method chloromethyl heptamethyl cyclotetrasiloxane may be readily produced.

The chloromethyl siloxanes, as indicated, are reacted with a metal salt of a carboxylic acid in the presence of a solvent for this salt. The carboxylic acid of the salt, as is known in organic chemistry in the general type of reaction with which the present invention deals, may be of widely divergent character. The dicarboxylic acids and the aromatic carboxylic acids may be employed if desired, though it is preferred to employ mono carboxylic aliphatic acids. The reaction is best conducted in the presence of the carboxylic acid in the free state, the salt of which is employed. Other solvent for the salt may be employed if desired. The metal of the salt as is known in the chemistry of this reaction is one the chloride of which is insoluble in the solvent. Thus, salts of the alkali metals, the alkaline earth metals and silver, are suitable.

The ester so obtained is subjected to alcoholysis. The ester is reacted with an alcohol as is known in the art of alcoholysis. An acid or basic catalyst promotes the reaction and the specific alcohol which is employed is virtually unlimited. It is desirable to employ an excess of the alcohol in order to obtain more favorable equilibrium. The reaction proceeds relatively slowly. In order to obtain the greatest yield possible from a given amount of the ester, it is desirable periodically to remove the ester of the alcohol employed in the alcoholysis. In plant operation the reaction may be produced in a cyclic manner with the withdrawal of the product alcohol and recycling of unreacted ester.

The alcohols produced in accordance herewith are of the average general formula $$R_n SiO_{\frac{4-n}{2}}$$

in which R represents hydroxymethyl radicals and hydrocarbon radicals, at least some of said R's being hydrocarbon radicals and at least 1 of said R's being hydroxymethyl radicals and $n$ has a value from 2 to 3.

The alcohols derived from the present process are of varying utility depending upon specific constitution. The bis-hydroxymethyl tetramethyl disiloxane may be interacted with a polymeric dimethyl siloxane to produce linear dimethyl siloxanes which contain hydroxymethyl dimethyl silyl radicals at the ends of the siloxane chains. Such materials have been found to be excellent antifoaming agents. These alcohols, it is to be noted, are many of them analogues of glycols and are accordingly of utility in the preparation of resins of the polyurethane and of the alkyd types. These alcohols are very reactive and are accordingly the starting point for the preparation of a wide range of derivatives paralleling derivatives obtainable in organic chemistry from alcohol.

EXAMPLES

*Example 1*

One equivalent of chloromethyl pentamethyl disiloxane was heated under reflux at atmospheric pressure for 24 hours with 1.1 equivalent of anhydrous potassium acetate in the presence of glacial acetic acid in amount equal in volume to the disiloxane employed. Potassium chloride precipitated. The reaction mixture was then washed with water until the wash water was neutral. The reaction product was then distilled. Upon distillation there was obtained a 25 mol per cent yield of hexamethyl disiloxane, a 25% yield of symmetrical bis-acetoxymethyl tetramethyl-disiloxane and 50 mol per cent yield of acetoxymethyl pentamethyl disiloxane. The two esters had the following formulae respectively:

(1) $[CH_3COOCH_2Si(CH_3)_2]_2O$
(2) $CH_3COOCH_2Si(CH_3)_2OSi(CH_3)_3$

Compound (1) was found to have the following properties:

A boiling point of 250° C. at 760 mm., an index of refraction at 25° C. of 1.4215, a specific gravity at 25° C. of 0.993, a molar refraction of 70.75 and a saponification equivalent of 141.

Compound (2) was found to have the following properties:

A boiling point of 180° C. at 735 mm., an index of refraction of 1.4040 at 25° C., density of 0.902 at 25° C. a molar refraction of 59.84 and a saponification equivalent of 220.

Compound 1 was reacted with 10 equivalents of absolute methyl alcohol in the presence of approximately 0.01 weight per cent hydrochloric acid. The solution was permitted to stand at room temperature for 24 hours. About 90 per cent of the theoretically possible amount of methanol-methyl acetate azeotrope was removed by distillation. The residue was diluted with a volume of methanol equal to the volume of distillate. After 24 hours at room temperature all volatile material was removed at 20 mm. pressure at room temperature with dry air bubbling into the liquid. The non-volatile residue was $[(CH_3)_2(CH_2OH)Si]_2O$. This compound has the following properties: An index of refraction of 1.4358 at 25° C., a density of 0.979 at 25° C., a melting point of −7.50 to −5° C., a viscosity of 9.1 centistokes at 56° C., and a molecular refraction of 51.68.

*Example 2*

The procedure of Example 1 was repeated using compound 2. Hexamethyl disiloxane was removed from the product with the volatiles which were removed at 20 mm. pressure. The product was found to be a mixture of the product obtained in Example 1 and $(CH_3)_3SiOSi(CH_3)_2CH_2OH$.

*Example 3*

Chloromethyl methyl silicon dichloride was hydrolyzed whereby there was obtained a relatively high molecular weight chloromethyl methyl siloxane. The acetoxy methyl derivative was produced in accordance with the methods above described. The polybasic alcohol was produced in accordance with the method described in Example 1. A polymer was obtained which had antifoaming properties and which when applied to a surface as a film produced a tough coating upon heating for 1 hour at 95° C.

*Example 4*

Dichloro(chloromethyl)methylsilane, in amount of 297 grams, was added to 588 grams of potassium acetate in acetic acid solution. The mixture was heated under reflux for 16 hours. The product so obtained was distilled whereby acetic anhydride was removed therefrom. The product was washed with water to remove residual acid and salts. A high polymer was thereby produced which had the formula $(CH_3COOCH_2SiCH_3O)_n$. When this polymer was heated, exposed to air for 62 hours at 150° C., there was observed no loss of weight therefrom. The polymer had an index of refraction at 25° C. of 1.4428 and a viscosity at 25° C. of 136.7 centistokes and at 3.3° C. of 403 centistokes. This polymer, in the amount of 210 grams, was added to 800 ml. of methanol and five drops of concentrated hydrochloric acid in order to convert the acetoxy methyl substituents to hydroxy substituents. A methyl alcohol-methyl acetate azeotrope was removed by distillation and residual methyl alcohol removed by distillation under vacuum. 210 ml. of a polymer were obtained which corresponded to the formula $(HOCH_2SiCH_3O)_n$. When this polymer was heated in a flask, a material was obtained which was resilient but which would flow gradually at room temperature. When the hydroxymethyl polymer was coated on sheet metal and heated for one hour at 95° C., a tough resilient coating was formed. The hydroxymethyl polymer without heating was successfully employed for preventing the foaming of hydrocarbon oils and of aqueous organic systems.

*Example 5*

Dichloro(chloromethyl)methylsilane was reacted with phenylmagnesium bromide by mixing two mols of the silane and 2.8 mols of the phenyl Grignard reagent. The product was distilled and the following materials were obtained thereby:

(1) Chloro(chloromethyl)methylphenylsilane having a boiling point of 136° C. at 24 mm.

(2) (Chloromethyl)methyldiphenylsilane which had a boiling point of 198° C. at 23 mm., an index of refraction at 25° C. of 1.5785 and a density at 20° C. of 1.101.

The chloro(chloromethyl)methylphenylsilane was hydrolyzed and the hydrolyzate distilled. There was thereby obtained symmetrical di(chloromethyl)dimethyldiphenyldisiloxane, $[C_6H_5CH_3(CH_2Cl)Si]_2O$. This compound was found to boil at 237° C. at 24 mm., to have an index of refraction at 25° C. of 1.5466 and a density at 25° C. of 1.161.

The disiloxane so produced was refluxed with a glacial acetic acid solution of potassium acetate, a slight excess of the potassium acetate being employed. After 18 hours of refluxing the mixture was washed with water and the product was distilled, whereby there was obtained symmetrical bis(acetoxymethyl)dimethyldiphenyldisiloxane. This compound had a boiling point of 210° to 220° C. at 1.4 mm., an index of refraction at 25° C. of 1.5118 and a density at 25° C. of 1.092.

40.2 grams of the disiloxane so produced were mixed with 36.7 grams of methylstearyldichlorosilane and 21.2 grams of phenylmethyldichlorosilane. This mixture was dissolved in ethanol. Reaction occurred which resulted in the hydrolysis of the silicon bonded chlorine, in interaction to produce a polysiloxane, and in the alcoholysis of the acetoxymethyl substituents to give hydroxymethyl substituents. The product so produced is a polysiloxane of the average composition $(HOCH_2C_6H_5CH_3SiO_{0.5})_2$
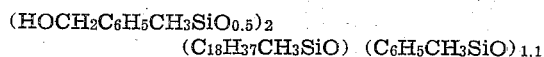
$(C_{18}H_{37}CH_3SiO)(C_6H_5CH_3SiO)_{1.1}$ This product is a viscous yellow fluid.

10 grams of this fluid were mixed with 2.3 grams of toluene-3,5-diisocyanate which was readily soluble in the siloxane and yielded a sparkling clear solution which grew warm and increased in viscosity until it became very thick. This product is a stable resinous liquid.

*Example 6*

The symmetrical bis(acetoxymethyl)dimethyldiphenyldisiloxane described in Example 5, in amount of 20.1 grams, was mixed with 11.1 grams of hexamethylcyclotrisiloxane, 177 cubic centimeters of methanol and 3 drops of concentrated aqueous hydrochloric acid. This resulted in the formation of a siloxane polymer and in the methanolysis of the acetoxymethyl substituents to produce hydroxymethyl substituents. The average formula of the product so produced is as follows:

$HOCH_2CH_3C_6H_5Si$
$[OSi(CH_3)_2]_3OSiCH_3C_6H_5CH_2OH$

This product was recovered from the reaction mixture by removing the volatile materials by passing a stream of dry air through the product at 125 mm. pressure. This product is a slightly colored odorless liquid.

This product, in the amount of 10 grams, was mixed with 3.4 grams of toluene-3,5-diisocyanate. The mixture was stirred and became a light amber colored homogeneous solution of about 200 centistokes viscosity. The visosity continued to increase during the course of the reaction. When the reaction rate slowed down as evidenced by the reaction mixture cooling, the mixture was heated to 135° C. for 15 minutes. A viscous liquid was thereby obtained. This polymer was applied to a metal panel as a coating. The panel so coated was polymerized by exposure to air for 3 days. There was thereby obtained a tough flexible coating. Heating of the panel for 2 days at 150° C. did not affect the properties of the coated panel.

That which is claimed is:

1. Compositions of the average general formula $$R_nSiO_{\frac{4-n}{2}}$$

in which R represents hydrocarbon radicals free of aliphatic unsaturation of the group consisting of alkyl and aryl radicals and hydroxymethyl radicals at least some of said R's being hydrocarbon radicals and at least one of said R's being a hydroxymethyl radical and $n$ has a value from 2 to 3 inclusive.

2. Compositions in accordance with claim 1 in which some of said hydrocarbon radicals are alkyl radicals and some phenyl radicals.

3. $[(CH_3)_2CH_2OHSi]_2O$.

4. $(CH_3)_3SiOSi(CH_3)_2CH_2OH$.

5. A polymer, the structural units of which correspond to the formula $HOCH_2SiCH_3O$.

JOHN LEOPOLD SPEIER, JR.

REFERENCES CITED

The following references are of record in the file of this patent:

Gold et al., "Jour. Am. Chem. Soc.," vol. 70, pages 2874–2876.

Volnov, "Jour. Gen. Chem.," (USSR) vol. 10 (1940), pages 1600–1604.

Niedzielski, "Jour. Am. Chem. Soc.," vol. 69 (1940), page 3519.